July 4, 1961 A. N. JACKSON 2,990,742
MACHINES FOR CROPPING TUBES
Filed Jan. 25, 1956 3 Sheets-Sheet 1
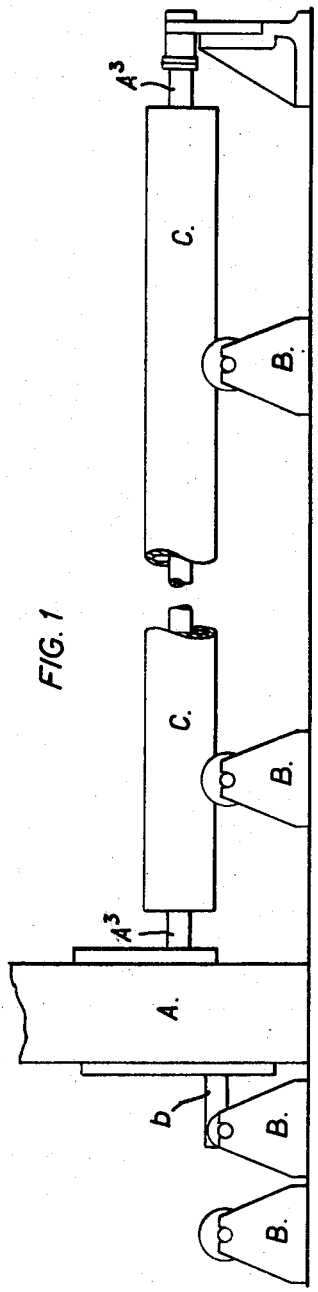

July 4, 1961  A. N. JACKSON  2,990,742
MACHINES FOR CROPPING TUBES
Filed Jan. 25, 1956   3 Sheets-Sheet 2
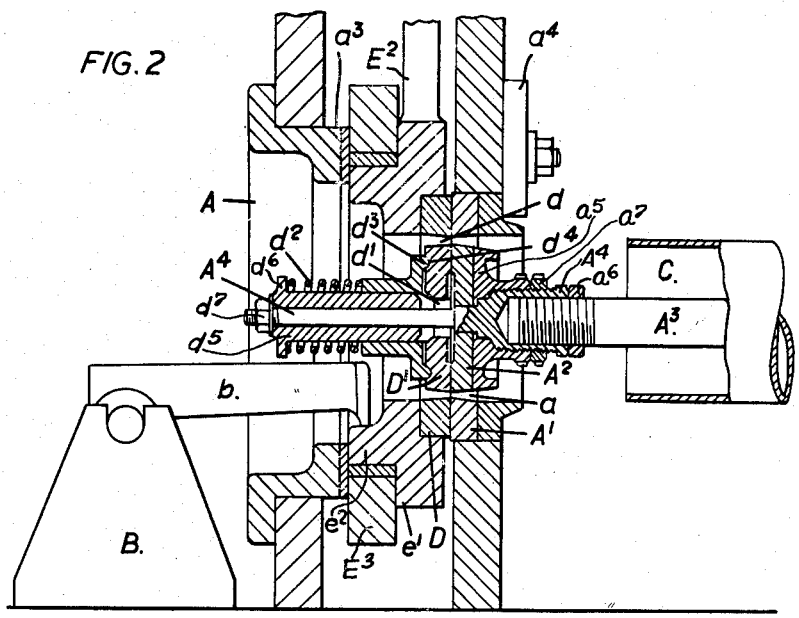
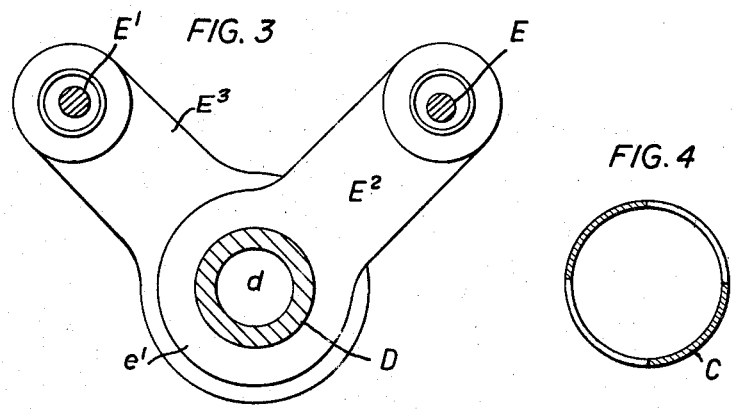
Inventor
Arthur N. Jackson
By
Norris & Bateman
Attorneys

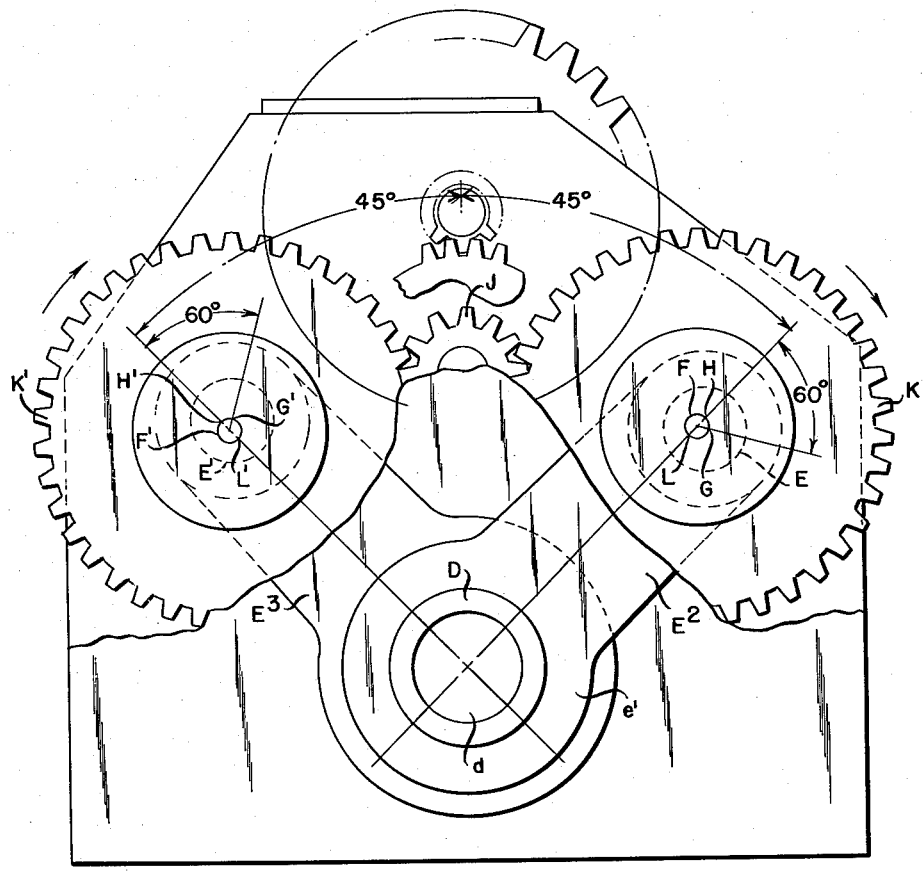

2,990,742
MACHINES FOR CROPPING TUBES
Arthur Newton Jackson, Castletown, Isle of Man, assignor to Arthur N. Jackson Limited, Douglas, Isle of Man, a company of the Isle of Man
Filed Jan. 25, 1956, Ser. No. 561,269
1 Claim. (Cl. 83—186)

This invention relates to improvements in machines for cropping steel and other tubes, its object being to reduce the distortion of the tubes as far as possible.

According to the invention the machine comprises fixed and movable external blades, provided with apertures to allow the tube to be cropped to pass therethrough and fixed and movable internal blades in the form of discs mounted on a central spindle or spindles to pass inside the tube to be cropped, the moving blades sliding in contact with their respective fixed blades to carry out the cropping operation.

The invention will be described with reference to the accompanying drawings:

FIG. 1 is a side elevation of the cropping portion of the machine,

FIG. 2 is a vertical section enlarged through the cropping mechanism,

FIG. 3 is a detail transverse section to a reduced scale showing two eccentric shafts for actuating the moving blades.

FIG. 4 is a diagram illustrating one cropping operation.

FIGURE 5 is a front elevation showing the drive for the eccentric shafts.

The machine comprises a head A and a plurality of pedestals B over which the tube C to be cropped is fed to the head A and over which the cropped portions are delivered. A pivoted support $b$ may be provided for short cropped lengths.

The cropping head A is formed with a fixed external blade $A^1$ and a moving external blade D provided with apertures $a$ and $d$ respectively of a suitable diameter and shape to enable the tube C to be cropped to be passed through them with the minimum of clearance, the moving blade D sliding in contact with the fixed blade $A^1$ from a position where the two shearing apertures coincide to a lower position where a shearing effect will have been produced on the tube C inserted through the apertures $a$, $d$ of both blades. The fixed blade $A^1$ is secured in position by clamping plates $a^4$ bolted to the frame of the head A.

Internal cutting blades in the form of discs are also provided, each internal blade being of a suitable external shape and diameter to pass inside the tube bore with the minimum of clearance. These internal blades consist of a fixed disc $A^2$ rigidly mounted on a central spindle $A^3$ and a second disc $D^1$ mounted on an extension $A^4$ of the spindle $A^3$ but with a central aperture $d^1$ which will give sufficient clearance on the spindle $A^4$ to allow this second disc $D^1$ to have a limited sliding movement in contact with the face of the fixed disc $A^2$. The moving disc $D^1$ is pressed against the stationary disc $A^2$ by spring pressure exerted by a spring $d^2$ or spring washer attached to the extremity of the central spindle $A^4$, the spring $d^2$ engaging a flanged sleeve $d^3$ which transmits the pressure to the moving disc $D^1$. The sleeve $d^3$ engages a groove $d^4$ in the disc $D^1$ when the machine is in the position to receive a tube C (FIG. 2) and disengages from the groove $d^4$ when cropping is in progress. This disengagement takes place as $d^3$ cams out of groove $d^4$ as permitted by spring $d^2$ during the downstroke. The spindle $A^4$ is formed with a screw threaded recess in one end to receive the end of the spindle $A^3$, the fixed blade $A^2$ being mounted on the end of the spindle $A^4$. The blade $A^2$ may thus be accurately positioned relatively to the external fixed blade $A^1$.

The central spindle $A^3$ which carries at one end the fixed and sliding internal discs $A^2$ and $D^1$ is preferably stationary, being fixed at one end to rear pedestal $B^1$, and is so located that the fixed internal disc $A^2$ is held inside the cutting aperture of the fixed external blade $A^1$ of the machine and accurately adjusted in position so that the cutting edge around the outside of the fixed internal disc $A^2$ is in the same plane as the cutting edge of the external fixed blade $A^1$ of the machine. In this position the internal moving blade $D^1$ will similarly be inside the cutting aperture of the moving external blade D with the cutting edge around the outside diameter of the internal blade $D^1$ lying on the same plane as the cutting edge of the external moving blade D of the machine. The external movable blade D and internal movable blade $D^1$ are mounted on a blade carrier $e^1$ which is operable in a manner hereinafter described.

The tube C to be cropped is placed in the machine around the spindle $A^3$ which holds the internal blades $A^2$, $D^1$ so that these internal blades are inside the tube C and the external blades are around the outside of the tube C while the blade carrier of the machine is at its top position in which position the external blade apertures correspond and the internal blades are also in the top of the stroke positon with their cutting edges lying together. Tube C is preferably inserted at the left end in FIGURE 1, support $b$ being pivotted out of the way temporarily.

The machine can then be operated, causing the external moving blade D to make a downward stroke which will shear the upper portion of the tube C which is supported by the fixed internal blade $A^2$ and the lower portion of the tube C which is supported by the fixed external blade $A^1$ will be sheared by the moving internal blade $D^1$.

With a machine as described having the moving blades moving only in a vertical direction, the top and the bottom of the tube C will be cropped before the sides of the tube and a considerable vertical working stroke of the moving blades is necessary to complete the cropping of the sides of the tube.

To overcome this disadvantage the machine is preferably arranged as shown in the drawings so that the moving blades D and $D^1$ are moved alternately in two directions, the two directions of movement being at 90° with each other when facing the end of the tube to be cut.

The machine is constructed with two eccentric shafts E, $E^1$ situated on two centre lines at 45° to the horizontal, and intersecting at the center points of the cutting head, one eccentric shaft E being above and to the right hand side of the aperture $a$ in the outer blade $A^2$ and the eccentric shaft $E^1$ being above said aperture to the left hand side when facing the end of the tube to be cut.

The central spindle $A^3$ which passes through the tube to be sheared is externally threaded at the end near the blades and carries the internally threaded extension $A^4$ and a locknut $a^6$ to lock the extension $A^4$ in axially adjusted position. The extension $A^4$ and locknut $a^6$ are each provided with hexagon flats for spanners.

The large end of the extension $A^4$ is also externally threaded to hold a circular back-up plate $a^5$ and a locknut $a^7$ therefor.

The fixed inner blade $A^2$ is bored to slide onto the extension $A^4$ where it rests in contact with the back-up plate $a^5$.

The moving inner blade $D^1$ has a large central hole to pass with large clearance over the extension $A^4$ where it makes contact with blade $A^2$.

The flanged sleeve $d^3$ has a rim extension turned to fit into the annular groove $d^4$ on the back surface of blade $D^1$ with the outer and inner sides of the groove at about 45° from the vertical plane.

The flanged sleeve $d^3$ is supported by a centering sleeve $d^5$ which is turned and bored to fit between the extension $A^4$ and the flanged sleeve $d^3$ and has at its outer end a flange $d^6$ to convey pressure to the compression spring $d^2$ mounted on the sleeve body and in contact with the sleeve $d^3$.

A hexagon nut $d^7$ is fitted to the end of extension $A^4$ to adjust the spring pressure which through the centering sleeve holds the blades $D^1$ and $A^2$ in spring-loaded contact with each other.

The arm $E^2$ terminates at its lower end in a large boss $e^1$, an extension of which in the form of a smaller boss $e^2$ fits inside the bushed bore of the lower boss of the arm $E^3$ as shown in FIGURE 2 and the large boss of arm $E^2$ has a bored recess to receive the outer moving blade D.

The outer fixed blade $A^1$ fits into a bored hole in the rigid frame plate of the machine and is held in contact with blade D by a washer and three clips $a^4$ attached to the back frame plate as by studs.

The front frame plate of the machine is bored to receive a flanged thrust member $a^3$ faced with phosphor bronze to retain the boss $e^1$ in its correct position to hold the outer blades D and $A^1$ in contact with each other.

The duty of the cutting blades in their first downward movement at 45° from say the right hand side of the machine as shown in FIG. 4 will be to crop those portions of the tube wall lying between the vertical and the horizontal at the right hand side at the top and at the left hand side at the bottom shown notched in FIG. 4 thus completely severing the tube wall in the two areas mentioned totalling half the cross-sectional area of the tube at the first stroke with the first shearing movement from the right hand eccentric E.

Similarly the left hand eccentric $E^1$ which operates immediately after will crop the remaining portions of the tube at the left top corner and the right bottom corner.

It should be noted that after the first cropping stroke from for instance the right hand eccentric this right hand eccentric returns the blades to their original top position pulling the partly cropped section of the tube back into its original position so that the partly cropped tube is lying in a true position ready to receive the succeeding and finishing crop from the left hand eccentric $E^1$ completely severing the tube.

With a machine arranged to operate its moving blades in two directions 90° apart, the working stroke of the blade is considerably less than would be required if the tube were to be cropped from one direction only thus effecting considerable reduction in the distortion of the cropped tube.

The eccentric E actuates the moving blade D through an arm $E^2$ mounted on the blade carrier $e^1$ and the eccentric $E^1$ actuates the blade D through an arm $E^3$, also mounted on the blade carrier $e^1$. The blade carrier $e^1$ slides between the fixed blade A and a guide $a^3$ on the head A.

Two main spur gears (FIGURE 5) K and $K^1$ are driven by a common pinion J and run continuously and are fitted with suitable clutches (not shown) to drive the two eccentric shafts E and $E^1$ on which the spur gears and clutches are mounted.

The clutches are engaged by a common control lever so arranged that only one clutch can be engaged at a time.

The right-hand eccentric E carries the thrust arm $E^2$ in which the outer moving blade D is mounted in its lower boss and this thrust arm lies and works in a line at about 45° with the horizontal to shear downwards at 45° to the left.

The left-hand eccentric $E^1$ carries the other thrust arm $E^3$ the lower boss of which is pivotally connected to the lower boss of the thrust arm $E^2$ by embracing a boss $e^2$ within its bore. This left-hand thrust arm $E^3$ lies and works in a line at about 45° with the horizontal to shear downwards at 45° to the right.

The track of the throw of the left-hand eccentric $E^1$ shown on FIGURE 5 is a circle $F^1$. As the shearing stroke of thrust link $E^3$ is downwards at 45 degrees to the left, the top-stroke position of the eccentric throw occurs at the point $H^1$. As the clutch disengages precisely after 60 degrees travel beyond top stroke in its clockwise direction the thrust link $E^3$ comes to rest with its top bore centered on point $G^1$ on the drawing.

When the left-hand eccentric shaft $E^1$ is engaged by its clutch the eccentric throw starts from the point $G^1$ and moves through 120 degrees on its shearing stroke to its bottom stroke position $L^1$ and continues through a further 180 degrees to the top stroke position $H^1$ and thence through a further 60 degrees to point $G^1$ where the clutch automatically disengages and the eccentric shaft $E^1$ and thrust arm $E^3$ come to rest.

Thus the down-stroke of 120 degrees is less than the up-stroke of 180 degrees, enabling the upward stroke of the thrust link $E^3$ to take up the two clearances between the outer and inner blades and the outside and inside surfaces of the wall of the tube being cut and also have enough further up-stroke available to exert a powerful lift to the half-severed tube to force it up into its original true position held before the first shearing stroke. The final further 60° of eccentric shaft travel before the clutch disengages allows the blades to descend slightly and stop in their original idle position with the blades again clear of the tube walls.

The above description of the arrangement of the left-hand eccentric shaft and thrust link also applies to the right-hand side of the machine except that $H^1$ becomes H, $G^1$ becomes G, etc.

In cutting a tube the left-hand eccentric shaft is first engaged causing two 90 degree segments of the tube to be severed at the left-hand top corner and the right-hand bottom corner FIGURE 5 and on the power up-stroke the half-severed tube is pulled back into line with the main tube body and the clearance between tube and blades is restored before the clutch disengages. The right-hand clutch is then engaged to complete the cutting of the tube.

I claim:

A machine for cropping tubes, comprising fixed and movable external apertured blades through which the tube to be cropped passes, and radially fixed and movable internal blades over which the tube to be cropped passes, a central spindle on which the internal blades are mounted, a blade carrier on which the external movable blade is mounted, a pair of arms pivotally connected to one another and to the blade carrier on an axis coincident with the center of the movable external blade, and eccentric shafts located in positions 90° apart around the central spindle and having eccentrics thereon engaging the respective arms for actuating them through successive separate cutting strokes of said carrier, said eccentrics having their effective radii set in relatively different angular positions to move the movable external blade in different directions 90° apart and in said succession.

References Cited in the file of this patent

UNITED STATES PATENTS

| | | |
|---|---|---|
| 2,038,255 | Worthington | Apr. 21, 1936 |
| 2,397,048 | Roop | Mar. 9, 1946 |
| 2,435,469 | Roop | Feb. 3, 1948 |
| 2,516,451 | Daukus | July 25, 1950 |
| 2,526,163 | Shippy et al. | Oct. 17, 1950 |
| 2,627,921 | Brehm | Feb. 10, 1953 |
| 2,701,014 | Daukus | Feb. 1, 1955 |

FOREIGN PATENTS

| | | |
|---|---|---|
| 13,538 | Great Britain | June 4, 1910 |
| 363,923 | Great Britain | Dec. 31, 1931 |